United States Patent
Hodel et al.

(10) Patent No.: US 10,032,117 B2
(45) Date of Patent: Jul. 24, 2018

(54) METHOD FOR DEVELOPING MACHINE OPERATION CLASSIFIER USING MACHINE LEARNING

(71) Applicant: Caterpillar Inc., Peoria, IL (US)

(72) Inventors: Benjamin Hodel, Dunlap, IL (US); Sangkyum Kim, Champaign, IL (US); Paul Lee, Savoy, IL (US)

(73) Assignee: Caterpillar Inc., Deerfield, IL (US)

( * ) Notice: Subject to any disclaimer, the term of this patent is extended or adjusted under 35 U.S.C. 154(b) by 971 days.

(21) Appl. No.: 14/489,191

(22) Filed: Sep. 17, 2014

(65) Prior Publication Data

US 2016/0078363 A1    Mar. 17, 2016

(51) Int. Cl.
*G06N 99/00* (2010.01)
*G05B 13/02* (2006.01)

(52) U.S. Cl.
CPC ....... *G06N 99/005* (2013.01); *G05B 13/0265* (2013.01)

(58) Field of Classification Search
None
See application file for complete search history.

(56) References Cited

U.S. PATENT DOCUMENTS

| 4,035,621 A | 7/1977 | Kemp |
| 5,204,865 A | 4/1993 | Moritoki et al. |
| 7,640,084 B2 | 12/2009 | Musser |
| 2003/0114965 A1 | 6/2003 | Fiechter et al. |
| 2006/0179017 A1* | 8/2006 | Forman .......... H04L 51/12 706/16 |

(Continued)

FOREIGN PATENT DOCUMENTS

WO    2012047529    4/2012

OTHER PUBLICATIONS

Hui Hu et al.: "Early Detection of Mining Truck Failure by Modelling Its Operation With Neural Networks Classification Algorithms", Jul. 29, 2002, XP55237325, Retrieved from the Internet: URL; http://web.mst.edu/'golosins/papers/Datamning/APCOM'3.doc, pp. 1-3.*

(Continued)

*Primary Examiner* — Paulinho E Smith
(74) *Attorney, Agent, or Firm* — Miller, Matthias & Hull (57) ABSTRACT

A method for developing machine operation classifiers for a machine is disclosed. The method includes receiving training data associated with the machine from one or more on-board engineering channels associated with the machine and determining one or more training features based on the training data values. The method also includes determining one or more training labels associated with the one or more training features and building a predictive model for determining machine operation classifiers using a computer. Building the predictive model may include feeding the one or more training features and the one or more training labels associated with the one or more training features to a machine learning algorithm and determining a predictive model from the machine learning algorithm. The predictive model may be used for receiving new data associated with the machine and determining a predicted label based on the new data.

20 Claims, 9 Drawing Sheets

(56) References Cited

U.S. PATENT DOCUMENTS

| | | | | |
|---|---|---|---|---|
| 2007/0192173 | A1* | 8/2007 | Moughler | G06Q 10/06 705/7.21 |
| 2008/0270074 | A1* | 10/2008 | Horkavi | G07C 5/008 702/182 |
| 2009/0037039 | A1 | 2/2009 | Yu et al. | |
| 2010/0063648 | A1 | 3/2010 | Anderson | |
| 2011/0119208 | A1 | 5/2011 | Kirshenbaum | |
| 2013/0066815 | A1 | 3/2013 | Oka et al. | |
| 2015/0371454 | A1* | 12/2015 | Hodel | G07C 3/00 702/34 |
| 2016/0078363 | A1* | 3/2016 | Hodel | G05B 13/0265 706/12 |
| 2016/0098637 | A1* | 4/2016 | Hodel | G05B 23/0221 706/12 |
| 2016/0104391 | A1* | 4/2016 | Wieland | G09B 19/003 434/219 |
| 2016/0349151 | A1* | 12/2016 | Sundermeyer | G01M 99/005 |

OTHER PUBLICATIONS

S.B. Kotsiantis, "Supervised Machine Learning: A Review of Classification Techniques", 2007, Informatica 31, pp. 249-268.*

Hui Hu et al.: "Early Detection of Mining Truck Failure by Modelling Its Operation With Neural Networks Classification Algorithm", Jul. 29, 2002, XP55237325, Retrieved from the Internet: URL; http://web.mst.edu/~golosins/papers/Dataming/APCOM'3. doc, pp. 1-3.

* cited by examiner

METHOD FOR DEVELOPING MACHINE OPERATION CLASSIFIER USING MACHINE LEARNING

TECHNICAL FIELD OF THE DISCLOSURE

The present disclosure generally relates to analytical models for predicting machine events and, more particularly, relates to systems and methods for developing machine operation classifiers using machine learning.

BACKGROUND OF THE DISCLOSURE

Various machines used in working environments in a field may perform a variety of operations or tasks. Knowing how such machines are being operated in the field (e.g., a work site) may give valuable insight into machine events and user usage patterns. Machine operations may include, but are not limited to including, tasks such as dig, dump, travel, idle, push, rip, heavy blade, light blade, ditch, cut, and the like. The machine operations may be based on what type of machine is being observed. Such machine types include, but are not limited to including, a motor grader, a track type tractor, a bulldozer, a paver, an electric rope shovel, and any other machine performing tasks at a worksite.

Analytical models may be developed to predict the operations of machines and related tasks based on input data from the machine based on on-board engineering channels. The input data may include conditions taken from system sensors or other data collection devices associated with the machine. Input data may include, but is not limited to including, machine torque, machine gears and gear ratios, readings from hydraulic sensors associated with lifts, ground and/or track speeds, slope data, and any other data indicative of a machine operation or task that is received from a sensor or device associated with the machine. Further, said input data may be used to derive data, based on physics, to determine data associated with an operation or task. Systems and methods for predicting operations using sensors have been employed, like, for example the systems disclosed in U.S. Pat. No. 4,035,621 ("Excavator Data Logging"), which uses sensor data to determine operation of an excavator.

Certain sets of data from the input data from the on-board engineering channels may be indicative of machine operations and/or tasks. Thusly, groups of data may be arranged in ways in which an analytics system may "predict" the operation of the machine based on data from the on-board engineering channels. However, such predictions may need to be assisted by user input for establishing rules or other manual methods for determining rules to predict an operation. Using such manual methods may be burdensome to the user and computationally inefficient.

A method for using on-board engineering channel data to more accurately determine machine operations is desired. Therefore, systems and methods for developing machine operation classifiers using machine learning are desired for creating predictive models for machine operations with greater accuracy and computational efficiency.

SUMMARY OF THE DISCLOSURE

In accordance with one aspect of the present disclosure, a method for developing machine operation classifiers for a machine is disclosed. The method may include receiving training data associated with the machine from one or more on-board engineering channels associated with the machine and determining one or more training features based on the training data values. The method may also include determining one or more training labels associated with the one or more training features and building a predictive model for determining machine operation classifiers using a computer. Building the predictive model may include feeding the one or more training features and the one or more training labels associated with the one or more training features to a machine learning algorithm and determining a predictive model from the machine learning algorithm. The predictive model may be used for receiving new data associated with the machine and determining a predicted label based on the new data. In some examples, the method may further include determining one or more elected channels from the one or more on-board engineering channels. In some such examples, determining the predictive model may include optimizing the predicted model based on the elected channels.

In accordance with another aspect of the present disclosure, a method for determining a predicted machine operation for a machine using a machine operation classifier is disclosed. The method may include receiving first data values associated with the machine from one or more on-board engineering channels associated with the machine and determining one or more first features from the first data values. The method may further include determining a first label for the first data values by using a predictive model. The predictive model is built by feeding one or more training features and one or more training labels associated with the one or more training features to a machine learning algorithm and determining the predictive model from the machine learning algorithm.

In accordance with yet another aspect of the disclosure, a system for developing machine operation classifiers for a machine is disclosed. The system may include one or more on-board engineering channels for providing training data associated with the machine. The system may include an input module for receiving the training data from the one or more on-board engineering channels, determining one or more training features based on the training data values, and determining one or more training labels associated with the one or more training features. The system may include a machine learning module for building a predictive model for determining machine operation classifiers. Building the predictive model may include feeding the one or more training features and the one or more training labels associated with the one or more training features to a machine learning algorithm and determining a predictive model from the machine learning algorithm. In some examples, the system may further include a predictive modelling module, the predictive modelling module receiving new data associated with the machine from the one or more on-board engineering channels and determining a predicted label based on the new data by using the predictive model.

Other features and advantages of the disclosed systems and principles will become apparent from reading the following detailed disclosure in conjunction with the included drawing figures.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

Detailed Description of the Disclosure

The present disclosure provides systems and methods for developing machine classifiers using machine learning. A machine operation classifier may observe operation of a machine and determine or predict the operation being performed by the machine. To develop machine operation classifiers, data input from the machine must be analyzed and organized. For optimizing the process of developing such a machine classifier, machine learning may be used.

Figure 1:
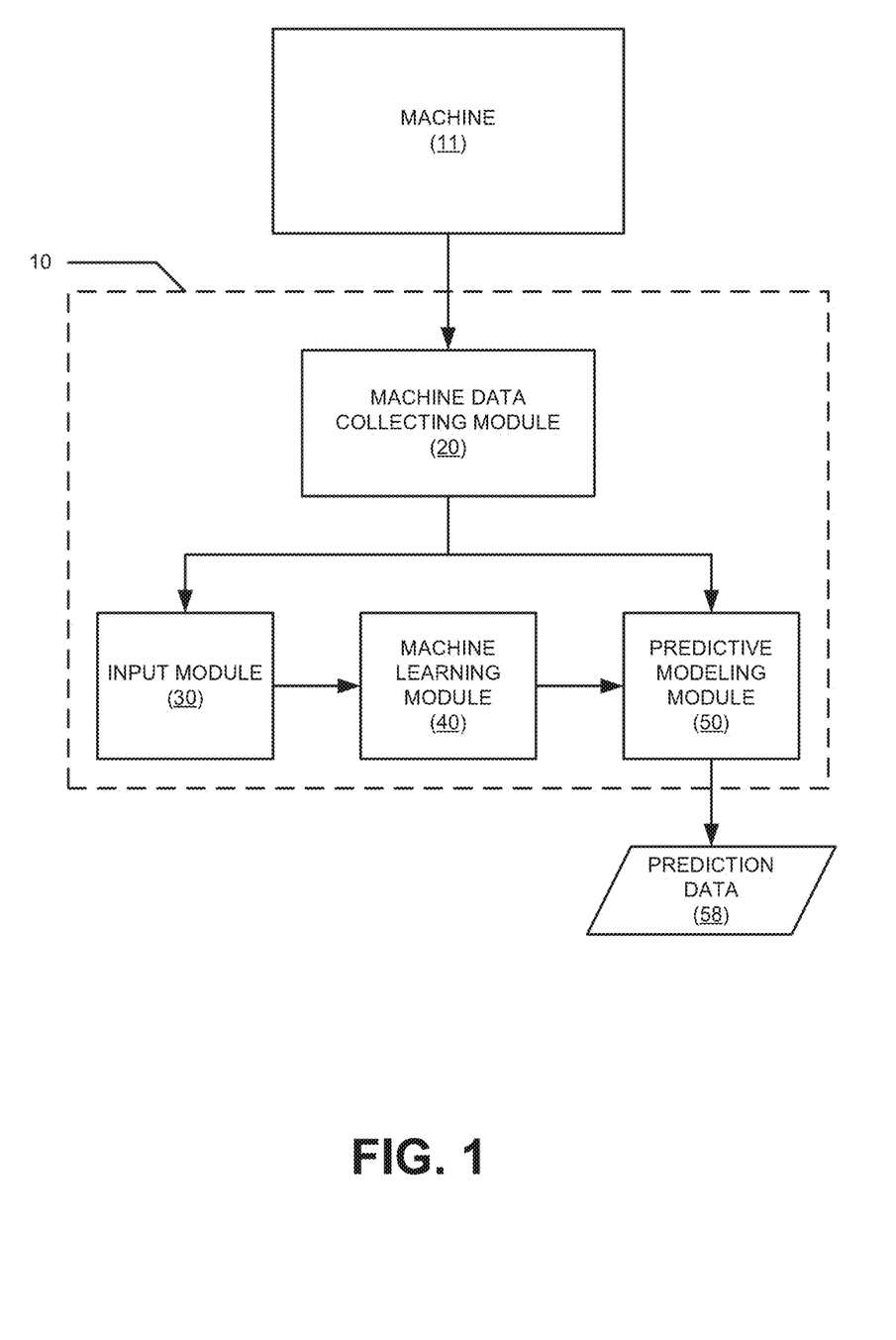
FIG. 1 is a schematic diagram of an example system for developing machine operation classifiers, in accordance with the present disclosure.

Turning now to the drawings and with specific reference to FIG. 1, a system 10 for developing machine operation classifiers using machine learning for a machine 11 is shown. The machine 11 may be any work machine designed to perform an operation at a worksite. Such example machines may include, but are not limited to including, a motor grader, a track type tractor, a bulldozer, a paver, an electric rope shovel, and any other machine performing tasks at a worksite. The operations of the machine 10 are based on the type of machine and may include, but are not limited to including, dig, dump, travel, idle, push, rip, heavy blade, light blade, ditch, cut, and the like.

The system 10 may include a machine data collecting module 20 for collecting data which may be associated with machine operations. The machine data collecting module 20 is shown in greater detail in FIG. 2, wherein the machine data collecting module receives data to produce on-board engineering channels 21 for use by the system 10 in determining machine operation classifiers. The on-board engineering channels 21 may include data associated with the machine that is received from, or derived from, sensing input devices associated with the machine. Such data may include, but is not limited to including, engine speed, torque, gear, articulation rate, rise rate, and the like. To produce the on-board engineering channels 21, the machine data collecting module 20 may include, but is not limited to including, a ground speed sensor 22, a track speed sensor 23, a slope sensor 24, a gear sensor 25, a hydraulic sensor 26, and any other sensors 27. In producing the on-board engineering channels 21, the machine data collecting module 20 may process data received by the one or more sensing elements 22-27 using physics equations to determine data associated with the machine 10.

Figure 3:
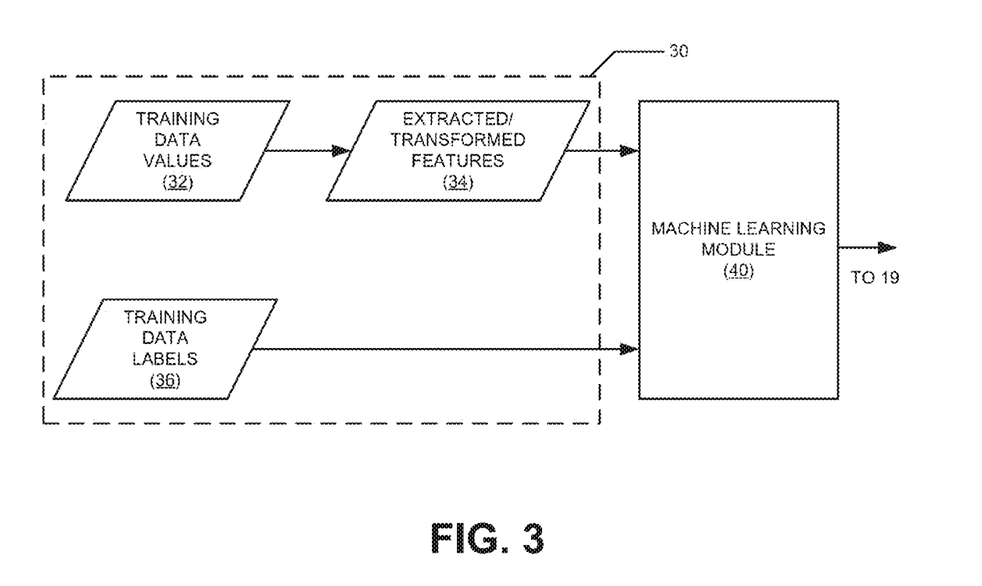
FIG. 3 is a schematic diagram of an example input module of the system for developing machine operation classifiers of FIG. 1, in accordance with the present disclosure.

Returning to FIG. 1, output from the machine data collecting module 20 (e.g., the on-board engineering channels 21) may be received by the input module 30, which is shown in greater detail in FIG. 3. The input module 30 may receive data from the data collecting module 20 in the form of training data values 32. The training data values may be used to determine extracted/transformed features 34 to create new calculated channels, as refined data associated with the machine 10. In some example embodiments, input module 30 may perform pre-processing on the data to determine the extracted/transformed features 34 in accordance with any pre-processing methods known in the art.

The training data values 32 and associated extracted/transformed features 34 are assigned a training data label 36 upon the time period of input. The training data labels 36 may be provided manually by an observer of the system. For example, the training data labels 36 may be determined by using video of the machine, showing its operation(s), that is time-synchronized with the training data values 32, each training data label 36 will accompany a certain time period of training data values 32. The training data labels 36 are a manual label of a machine operation of the machine 10 and are associated with the period of training data values 32 of its time period. For example, if the machine 10 is an excavator and it is travelling during a certain time period for training data values 32, the input data label 36 will indicate that the machine operation is "travel."

The extracted/transformed features 34 (based on the training data values 32) and their associated training labels 36 are then input or passed into a machine learning module 40. The machine learning module 40 may operate to build a model for operation classification using machine learning algorithms in conjunction with the extracted/transformed features 34 and associated training label 36. Machine learning algorithms develop systems which learn from data (such as the extracted/transformed features 34 and the associated training labels 36) rather than only following explicitly programmed instructions. In this case, the machine learning module 40 is "taught" by inputting the extracted/transformed features 34 and associated labels 36 to create a model operation classifier, or prediction model, which will receive data from an input source (e.g., the machine data collecting module 20) and, based on said data, will determine a machine operation for the input data.

Figure 2:
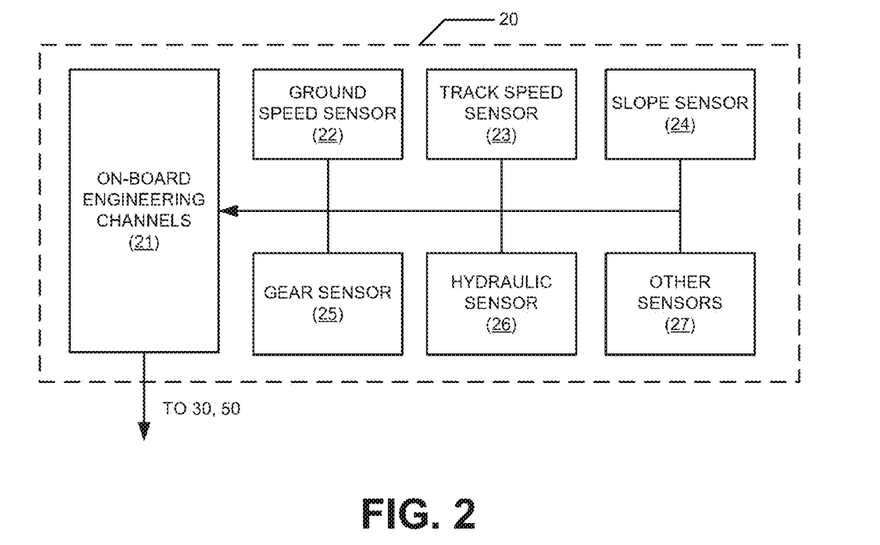
FIG. 2 is a schematic diagram of an example machine data collecting module associated with the system for developing machine operation classifiers of FIG. 1, in accordance with the present disclosure.
Figure 4:
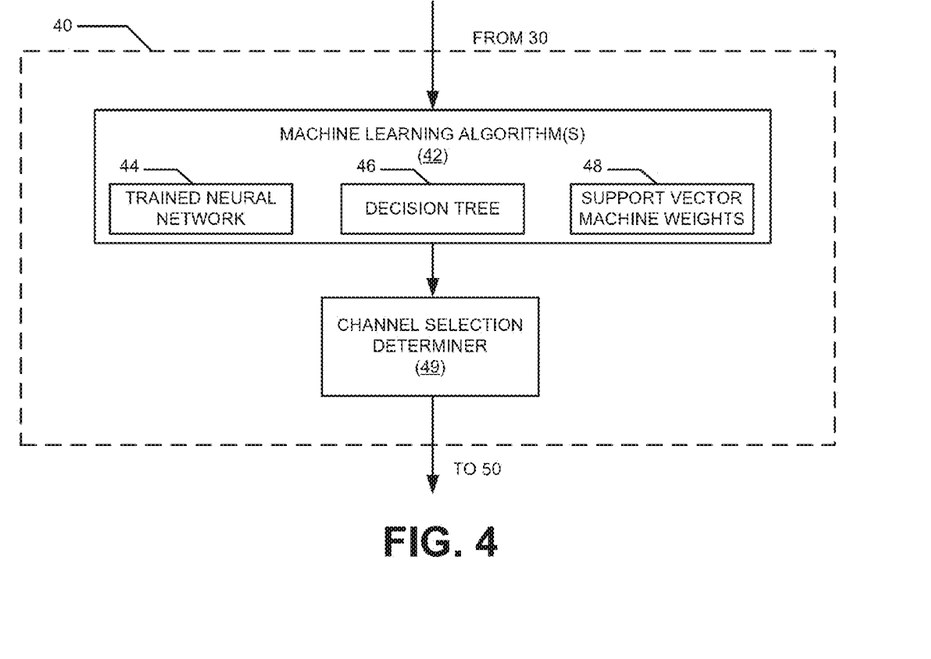
FIG. 4 is a schematic diagram of an example machine learning module of the system for developing machine operation classifiers of FIG. 1, in accordance with the present disclosure.

Referring now to FIG. 4 and with continued reference to elements of FIGS. 1-3, an example machine learning module is shown. The machine learning module 40 receives input from the input module 30 (e.g., the extracted/transformed features 34 and associated labels 36) as input and to develop, create, or optimize a machine learning algorithm 42. The machine learning algorithm may include any methods for creating algorithms or any algorithm types known in the art of machine learning. For example, the machine learning algorithm 42 may use, but is not limited to using, a trained neural network 44, a decision tree 46, support vector machine weights 48, and the like. A trained neural network is a learning algorithm that is based on the structure and functional aspects of biological neural networks. For example, computations in a trained neural network may be structured in terms of an interconnected group of artificial neurons to process information using a connectionist approach to computation. Implementation of a decision tree 46 in the machine learning algorithm 42 includes using a decision tree as a predictive model to map observations about an item to conclusions about the item's target value. For example, a decision tree 46 may map certain outcomes of values for extracted/transformed features 34 to training labels 36 for determining a correlation to use in predictive modelling. Support vector machine weight algorithms 48 may analyze data and recognize patterns to assign new examples into categories based on a weighted algorithm from training data. Support vector machine algorithms may analyze data and optimize a hyperplane or set of hyperplanes in multidimensional space such that a maximum margin is created between one or more pairs of binary classes. While the above mentioned machine learning algorithms may be used, the machine learning algorithm 42 may also include, but is not limited to including random forests, naïve Bayes, logistic regression, ensemble methods (e.g., boosted ensembles, bagged ensembles), and the like.

The machine learning module 40 may also include a channel selection determiner 49 to determine select channels for use in predictive modelling. The channel selection determiner may select a subset of the on-board engineering channels 21 to optimize the formation of the predictive model by decreasing the number of channels needed. During training data collection, the channel selection determiner 49 may elect one or more elected channels from the transformed/extracted features 34 associated with each prospective label. Therefore, in use, the predictive model for machine operation classification has to analyze a smaller number of channels. The methods for determining the elected channels may be any machine learning method in the art. For example, recursive feature elimination may be used to determine the elected channels.

Figure 5:
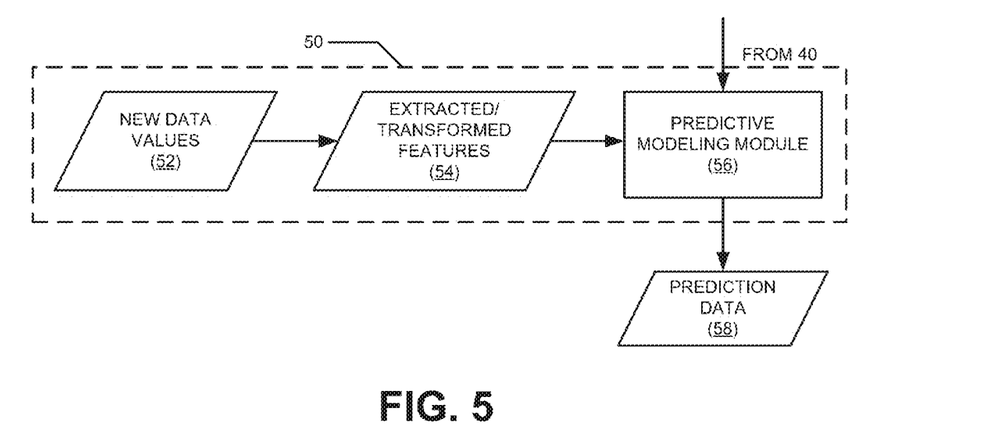
FIG. 5 is a schematic diagram of an example model predictive modelling module of the system for developing machine operation classifiers of FIG. 1, in accordance with the present disclosure.

The resultant predictive model created by the machine learning algorithm 42 (and, optionally, optimized by the channel selection determiner 49) is used by a predictive modelling module 50 of the system 10, as shown in greater detail in FIG. 5. The predictive modelling module 50 receives new data values 52 to derive new extracted/transformed features 54. The new extracted transformed features are then fed to a predictive modelling module 56. The predictive modelling module 56 uses the resultant predictive model of the machine learning module 40 to determine prediction data 58, which may include a predicted label associated with the time period of the new data values 52. For example, if the machine 10 is an excavator and the new data values 52 indicate to the predictive modeling module 56 characteristics associated with a travelling operation (as derived from the training performed in creating the model), the prediction data 58 should indicate that the machine 10 operation is "travel."

Figure 6:
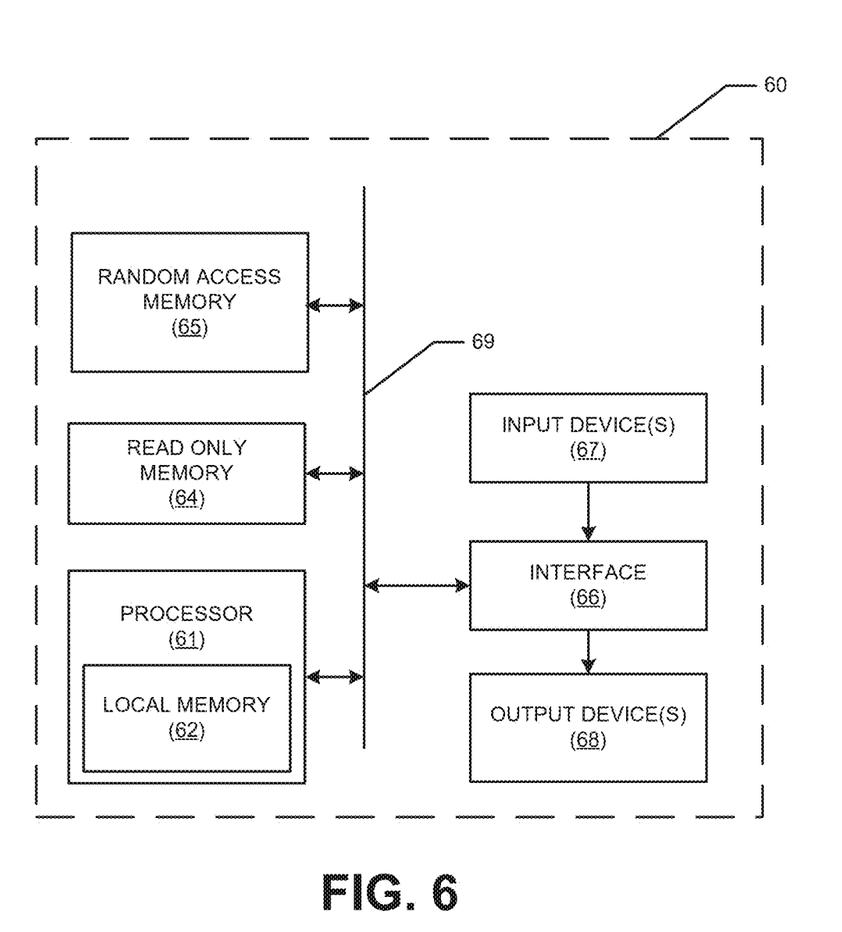
FIG. 6 is a schematic diagram for an example computer that may execute instructions for providing the example systems and methods of the present disclosure.

Any combination of hardware and/or software may be used to implement any of the modules of FIGS. 1-5. FIG. 6 is a block diagram of an example computer 60 capable of executing instructions to realize the modules of FIGS. 1-5 and/or execute instructions to perform the methods discussed below in reference to FIGS. 7-9. The computer 60 can be, for example, a server, a personal computer, or any other type of computing device. The computer 60 of the instant example includes a processor 61. For example, the processor 61 can be implemented by one or more microprocessors or controllers from any desired family or manufacturer.

The processor 61 includes a local memory 62 and is in communication with a main memory including a read only memory 64 and a random access memory 65 via a bus 69. The random access memory 65 may be implemented by Synchronous Dynamic Random Access Memory (SDRAM), Dynamic Random Access Memory (DRAM), RAMBUS Dynamic Random Access Memory (RDRAM) and/or any other type of random access memory device. The read only memory 64 may be implemented by a hard drive, flash memory and/or any other desired type of memory device.

The computer 60 may also include an interface circuit 66. The interface circuit 66 may be implemented by any type of interface standard, such as, for example, an Ethernet interface, a universal serial bus (USB), and/or a PCI express interface. One or more input devices 67 are connected to the interface circuit 66. The input device(s) 67 permit a user to enter data and commands into the processor 61. The input device(s) 67 can be implemented by, for example, a keyboard, a mouse, a touchscreen, a track-pad, a trackball, and/or a voice recognition system.

One or more output devices 68 are also connected to the interface circuit 66. The output devices 68 can be implemented by, for example, display devices for associated data (e.g., a liquid crystal display, a cathode ray tube display (CRT), etc.).

As mentioned above the computer 60 may be used to execute machine readable instructions. For example, the computer 60 may execute machine readable instructions to implement the modules of FIGS. 1-5 and/or perform the methods shown in the block diagrams of FIGS. 7-9. In such examples, the machine readable instructions comprise a program for execution by a processor such as the processor 61 shown in the example computer 60. The program may be embodied in software stored on a tangible computer readable medium such as a CD-ROM, a floppy disk, a hard drive, a digital versatile disk (DVD), a Blu-ray disk, or a memory associated with the processor 61, but the entire program and/or parts thereof could alternatively be executed by a device other than the processor 61 and/or embodied in firmware or dedicated hardware. Further, although the example programs are described with reference to the schematic diagrams of FIGS. 1-5 and/or the flowcharts illustrated in FIGS. 7-9, many other methods of implementing embodiments of the present disclosure may alternatively be used. For example, the order of execution of the blocks may be changed, and/or some of the blocks described may be changed, eliminated, or combined.

Figure 7:
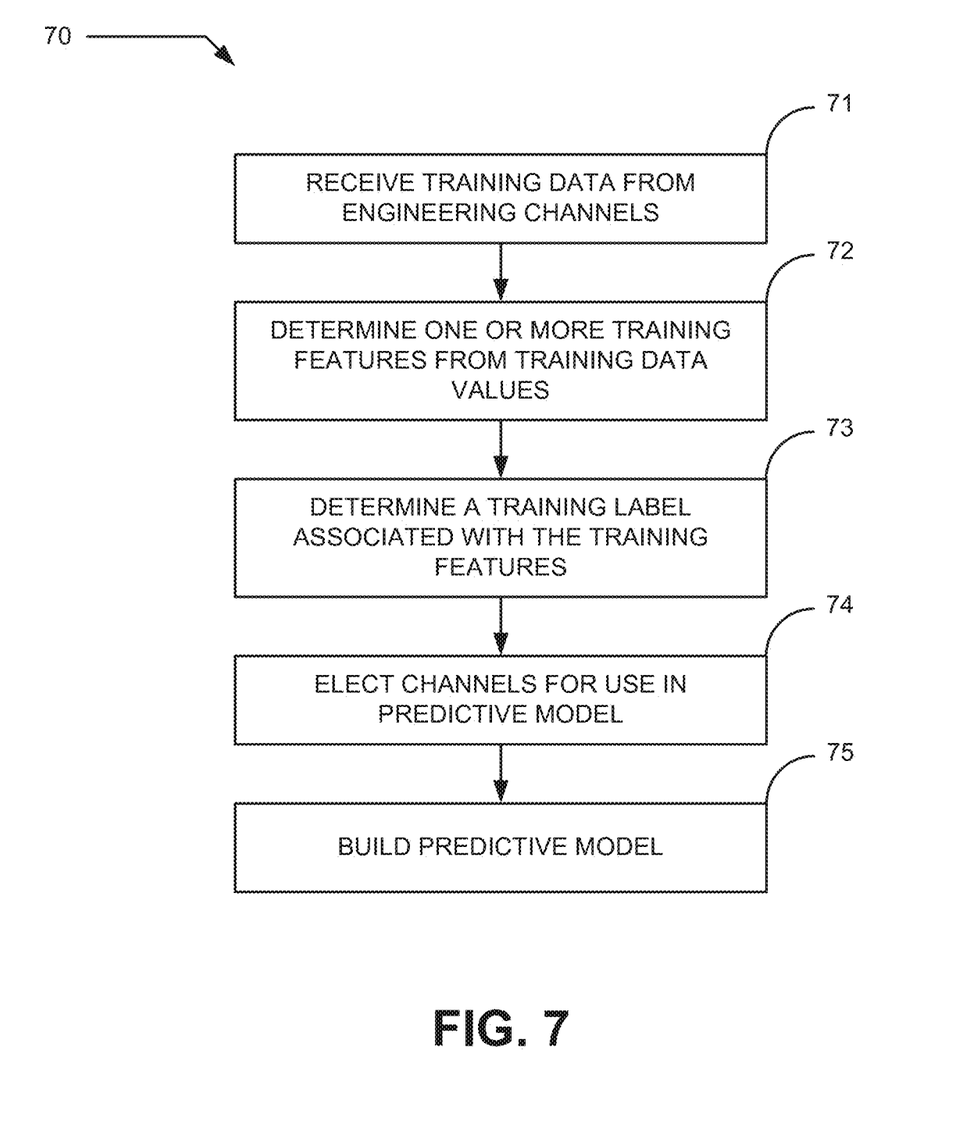
FIG. 7 is an example method for developing machine operation classifiers using machine learning, in accordance with the present disclosure.

Turning now to FIG. 7, and with continued reference to FIGS. 1-5, a flowchart for an example method 70 for developing machine operation classifiers for the machine 10 is shown. The method 70 begins with reception of training data values 32 associated with the machine 10 from one or more on-board engineering channels 21 (block 71). Using the training data values 32, training extracted/transformed features 34 are determined (block 72). The method 70 includes determining training labels 36 associated with the training extracted/transformed features 34 (block 73). One or more on-board engineering channels 21 may be selected for determination of a predictive model, as elected channels, based on the training features 34 and associated training labels 36 (block 74). Using a computer, such as the computer 60, a predictive model is built from the machine learning algorithm and input data (block 75).

Figure 8:
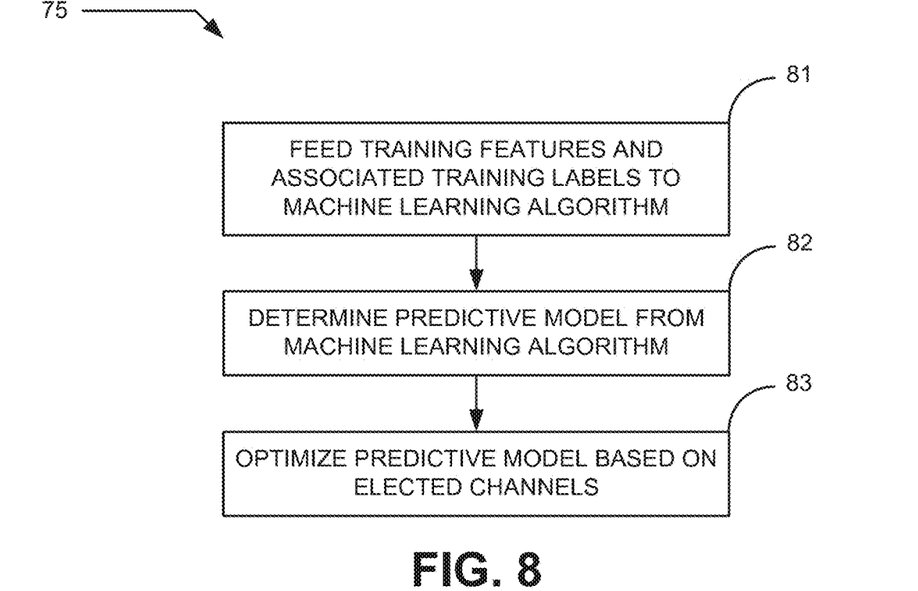
FIG. 8 is an example method for building a predictive model as part of the method for developing machine operation classifiers using machine learning of FIG. 7, in accordance with the present disclosure.

Determination of the predictive model (block 75) is further described in a flowchart in FIG. 8. Determination of the predictive model begins by feeding the training extracted/transformed features 34 and the associated training labels 36 to the machine learning algorithm 42 (block 81). As detailed above, the machine learning algorithm 42 may include, but is not limited to including a trained neural network 44, a decision tree 46, and support vector machine weights 48. The method then determines the predictive model from the machine learning algorithm, wherein the predictive model (e.g., the predictive modelling module 50) receives new data associated with the machine and determines a predicted label based on the received new data.

Figure 9:
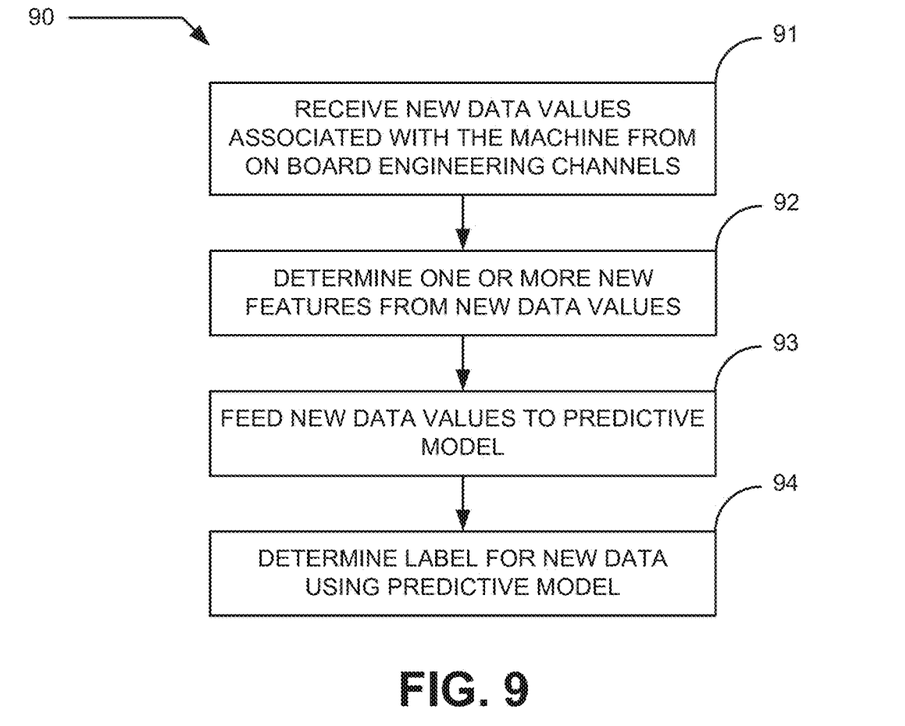
FIG. 9 is an example method for determining a label for new data input to a predictive model developed by the method for developing machine operation classifiers of FIG. 7, in accordance with the present disclosure.

FIG. 9 is a flowchart of an exemplary method 90 for employing the operation classifier developed by the method 70 of FIG. 7 to predict the operation of the machine 10. The method 90 begins by receiving new data values 52 associated with the machine 10 from on-board engineering channels 21 (block 91). The method 90 then determines one or more new extracted/transformed features 54 based on the new data values 52. The new extracted/transformed features 54 are then fed to the model predictive module 56, which includes the predicted model developed by the method 70 (block 93). Using the predicted model, the method 80 determines a label for the new extracted/transformed features 54 (block 94).

INDUSTRIAL APPLICABILITY

The present disclosure relates generally to analytical models for predicting machine events and, more particularly, relates to systems and methods for developing machine operation classification using machine learning. The disclosed systems and methods may be used to predict machine operations of a variety of machines 10, which include, but are not limited to including, an excavator, a grader, or a wheel loader. As described below, and with reference to FIGS. 10-12, the disclosed systems and methods may be used to predict particular operations of said machines based on input from the on-board engineering channels 21.

Figure 10:
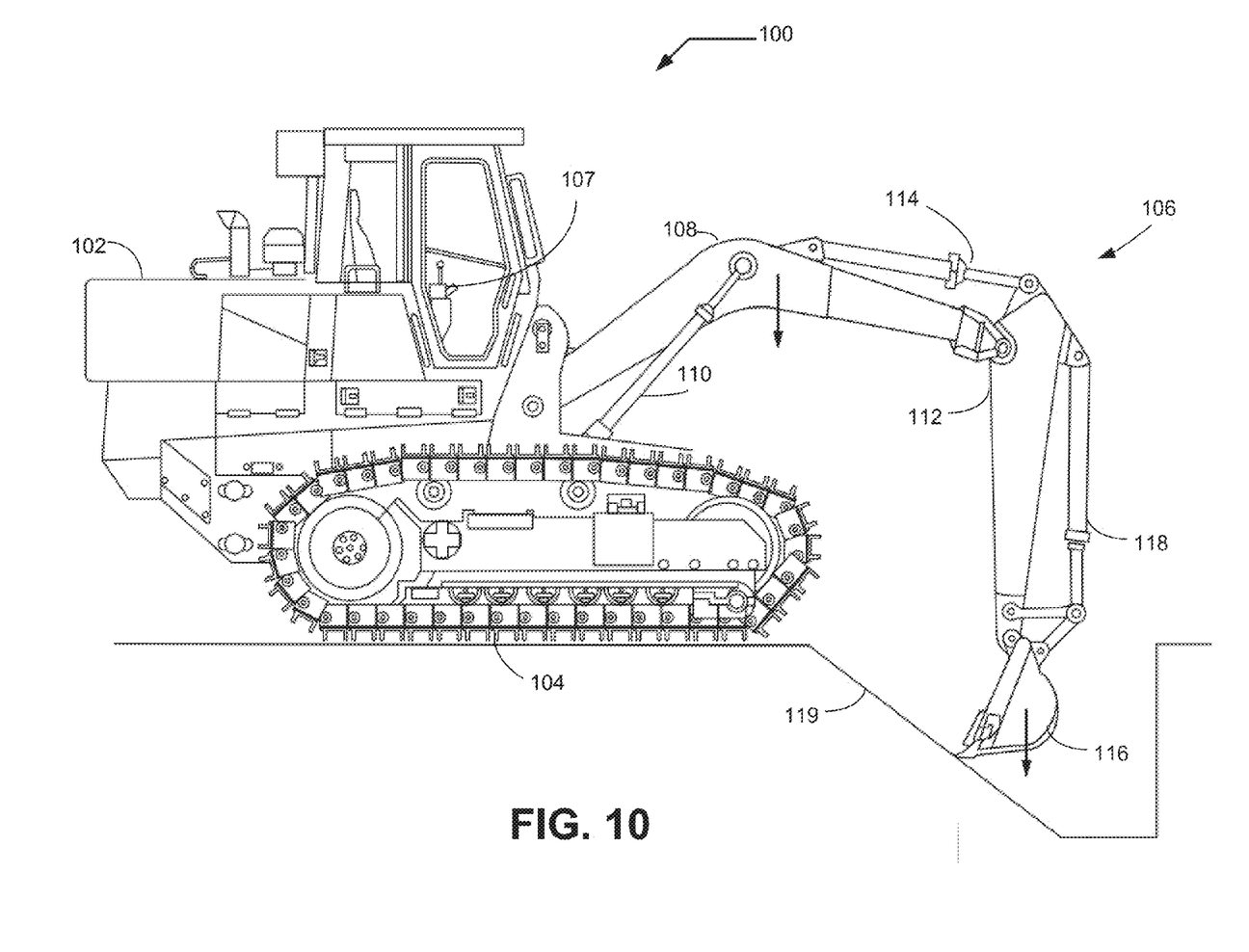
FIG. 10 is a side view of an example machine, from which the example systems and methods may collect data to develop machine operation classifiers for the machine, in accordance with the present disclosure.

Turning to FIG. 10, an excavator 100 is shown. The excavator 100 may have an engine 102, tracks 104 for propulsion, and an implement 106 for use in performing a work function (e.g., digging). The implement 106 may include a boom 108 and a boom cylinder 110 used to raise and lower the boom 108. The implement 106 may also include a stick 112 that extends and retracts using a stick cylinder 114 and may further include a tool, such as a bucket 116, which rotates using a bucket cylinder 118. In operation, the excavator 100 may use combinations of cylinder positions to engage the bucket 116 into a dig site to remove material and then to maneuver the bucket 116 to dump the material away from the dig site or into a dump truck or the like.

At a high level, the basic operations of the excavator 100 may include 'travel' using the tracks 104, 'dig,' and 'dump.' At a lower level, the excavator 100 may also perform functions including boom raise and lower, stick reach and pull, as well as bucket rotate in and bucket rotate out. Each of these operations may be accomplished by one or a combination of events, including tool events, direction events, gear events, and power events. The identification of such events may be predicted by determining, via the machine learning module 40, what data values derived from the on-board engineering channels 21 are associated with which events. Using the disclosed systems and methods, the machine operations of an excavator 100 may accurately be predicted with great computational efficiency.

Figure 11:
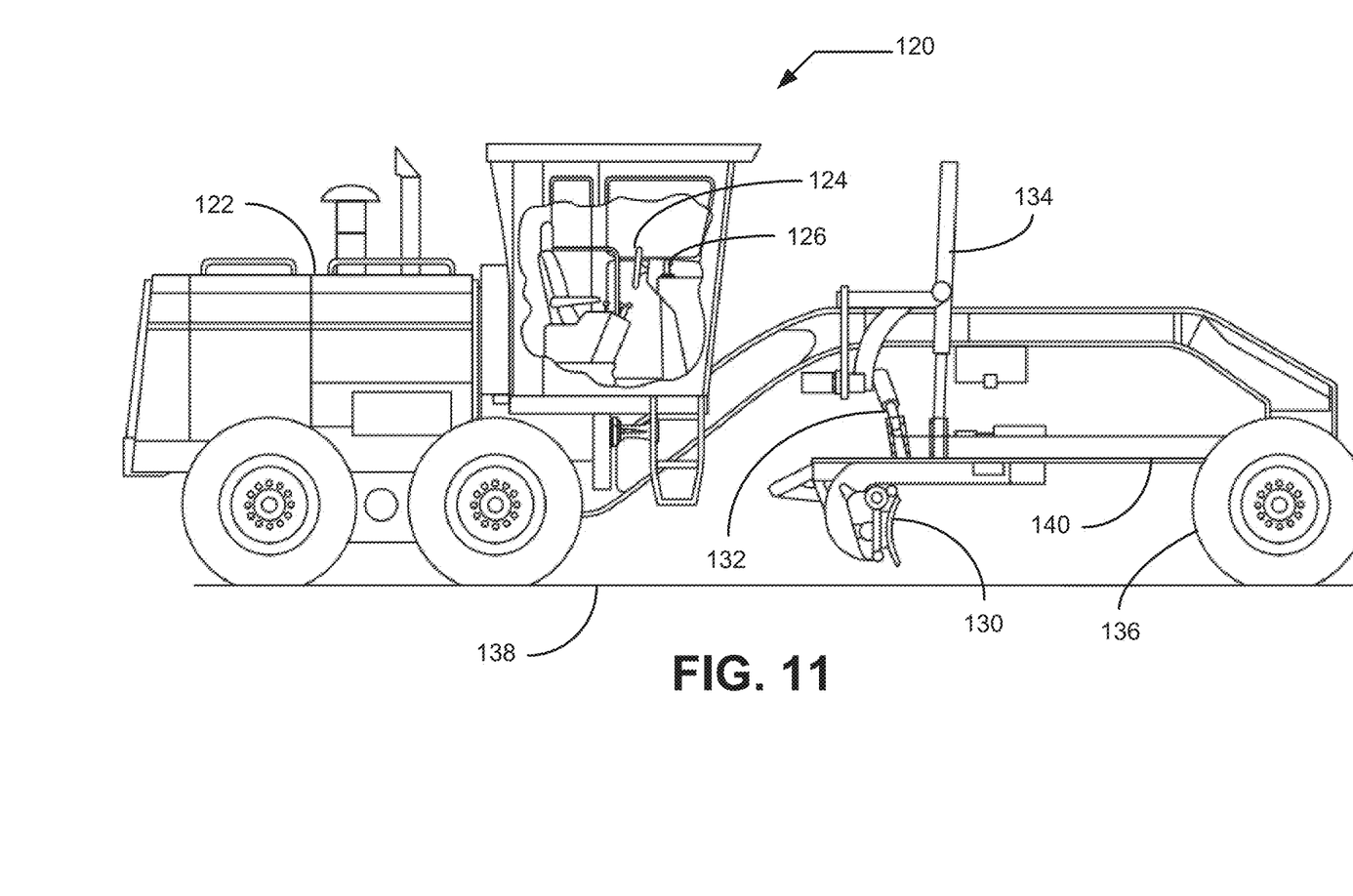
FIG. 11 is a side view of a second example machine, from which the example systems and methods may collect data to develop machine operation classifiers for the second machine, in accordance with the present disclosure.

Further, FIG. 11 illustrates a grader 120 having a motor 122, a steering wheel 124, blade control 126, a blade 130, a blade angle cylinder 132 and a height cylinder 134. The grader 120 may include steerable wheels 136. The grader 120 is configured to scrape and level a worksite 138 using the blade 130. As with the excavator 100 above, the grader 120 may operate in several modes including a transport mode and a grading mode. Machine operations to be observed and predicted by the disclosed systems and methods may include, but are not limited to including, idle, finish blading, heavy blading, ripping, scarifying, roading, road maintenance, ditch building, ditch cleaning, snow plowing, snow removal, blade slope work, slide slope work, and the like. All such operations and modes may be predicted using a predictive model developed by the disclosed systems and methods.

Figure 12:
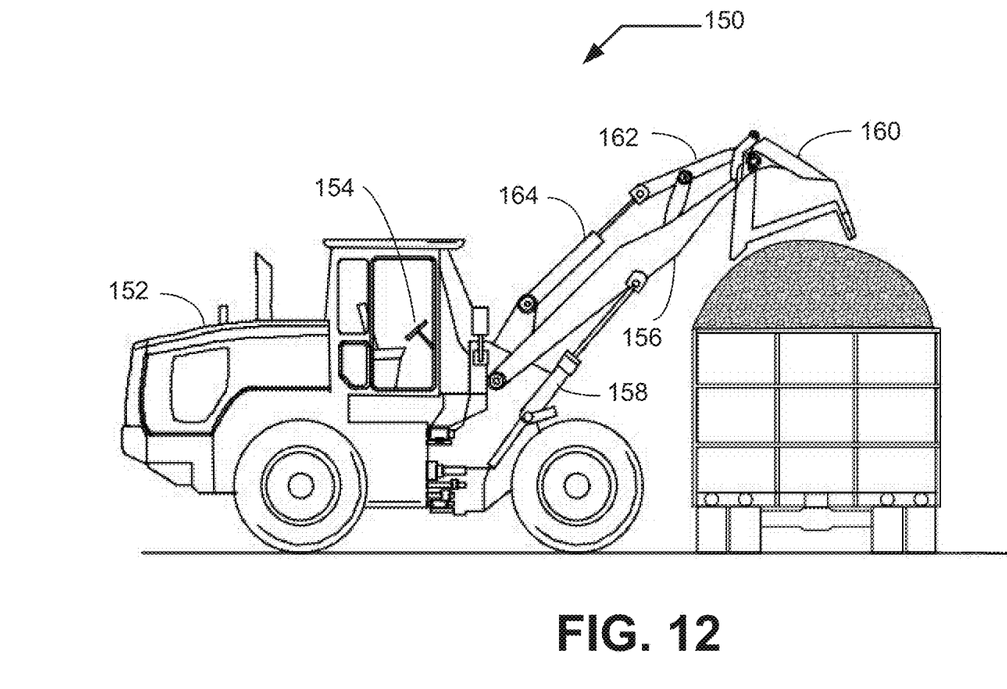
FIG. 12 is a side view of a third machine, from which the example systems and methods may collect data to develop machine operation classifiers for the third machine, in accordance with the present disclosure.

The systems and methods of the present disclosure may also be applicable to a wheel loader 150, as shown in FIG. 12. The wheel loader may include a motor 152, operator control 154, a boom 156, boom cylinder 158, and bucket 160. The bucket 160 may be rotated between a load position and dump position. As with the excavator 100 and the grader 120, machine operations performed by the loader may be predicted using machine learning in association with the systems and methods of the present disclosure.

It will be appreciated that the present disclosure provides and systems and methods for developing machine operation classifiers using machine learning. While only certain embodiments have been set forth, alternatives and modifications will be apparent from the above description to those skilled in the art. These and other alternatives are considered equivalents and within the spirit and scope of this disclosure and the appended claims.

What is claimed is:
1. A method for developing machine operation classifiers for a machine, the method comprising:
   receiving training data associated with the machine from one or more on-board engineering channels associated with the machine;
   determining one or more training features based on the training data values;
   determining one or more training labels associated with the one or more training features upon a time period of input of the training data, wherein each training data label will accompany a certain time period of training data values and correspond to one of a plurality of predetermined machine operations;
   building a predictive model, using a computer, for determining machine operation classifiers, building the predictive model includes;

feeding the one or more training features and the one or more training labels associated with the one or more training features to a machine learning algorithm; and determining a predictive model from the machine learning algorithm, the predictive model for receiving new data associated with the machine and determining a predicted label based on the new data.

2. The method of claim 1, wherein the one or more on board engineering channels includes a plurality of on-board engineering channels associated with the machine and the method further comprises determining one or more elected channels from the plurality of on-board engineering channels.

3. The method of claim 2, wherein determining the one or more elected channels includes recursive feature elimination on the plurality of on-board engineering channels.

4. The method of claim 2, wherein determining the predictive model further includes optimizing the predictive model based on input from the one or more elected channels.

5. The method of claim 1, wherein the machine learning algorithm utilizes, at least, a trained neural network.

6. The method of claim 1, wherein the machine learning algorithm utilizes, at least a decision tree.

7. The method of claim 1, wherein the machine learning algorithm utilizes, at least, support vector machine weights.

8. The method of claim 1, wherein determining one or more training labels associated with the one or more training features is performed using video, the video being synchronized with the training data.

9. A method for determining a predicted machine operation for a machine using a machine operation classifier, the method including:

receiving first data values associated with the machine from one or more on-board engineering channels associated with the machine;

determining one or more first features from the first data values;

determining a first label for the first data values upon a time period of input of the first data by using a predictive model, wherein the first label will accompany a certain time period of first data values and correspond to one of a plurality of predetermined machine operations, the predictive model being built by:

feeding one or more training features and one or more training labels associated with the one or more training features to a machine learning algorithm; and determining the predictive model from the machine learning algorithm.

10. The method of claim 9, wherein the machine learning algorithm includes at least one of a trained neural network, a decision tree, and support vector machine weights.

11. A system for developing machine operation classifiers for a machine, the system comprising:

one or more on-board engineering channels for providing training data associated with the machine;

an input module for receiving the training data from the one or more on-board engineering channels, determining one or more training features based on the training data values, and determining one or more training labels associated with the one or more training features upon a time period of input of the training data, wherein each training data label will accompany a certain time period of training data values and correspond to one of a plurality of predetermined machine operations;

a machine learning module for building a predictive model for determining machine operator classifiers, building the predictive model by the machine learning module includes:

feeding the one or more training features and the one or more training labels associated with the one or more training features to a machine learning algorithm; and determining a predictive model from the machine learning algorithm.

12. The system of claim 11, further comprising a predictive modelling module, the predictive modelling module receiving new data associated with the machine from the one or more on-board engineering channels and determining a predicted label based on the new data by using the predictive model.

13. The system of claim 11, further comprising one or more machine sensors associated with the machine and the one or more on-board engineering channels, the on-board engineering channels determining the training data from the machine data provided by the machine sensors.

14. The system of claim 13, wherein the one or more system sensors include at least one of a ground speed sensor, a track speed sensor, a slope sensor, a gear sensor, and a hydraulic sensor.

15. The system of claim 11, wherein the one or more on board engineering channels includes a plurality of on-board engineering channels associated with the machine and the machine learning module determines one or more elected channels from the plurality of on-board engineering channels.

16. The system of claim 15, wherein determining the one or more elected channels include performing recursive features elimination of the plurality of on-board engineering channels.

17. The system of claim 15, wherein determining the predictive model further includes optimizing the predictive model based on input from the one more elected channels.

18. The system of claim 11, wherein the machine is an excavator.

19. The system of claim 11, wherein the machine is a grader.

20. The system of claim 11, wherein the machine is a wheel loader.

* * * * *